(12) United States Patent
Ortler et al.

(10) Patent No.: US 7,520,710 B2
(45) Date of Patent: Apr. 21, 2009

(54) FASTENING ELEMENT

(75) Inventors: Rene Ortler, Schaan (LI); Sven Dietze, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 348 days.

(21) Appl. No.: 11/205,262

(22) Filed: Aug. 15, 2005

(65) Prior Publication Data

US 2006/0041226 A1 Feb. 23, 2006

(30) Foreign Application Priority Data

Aug. 23, 2004 (DE) .................. 10 2004 040 701

(51) Int. Cl.
*F16B 15/00* (2006.01)
(52) U.S. Cl. ...................... 411/440; 411/453
(58) Field of Classification Search ................. 411/453, 411/372, 451.1, 412, 440
See application file for complete search history.

(56) References Cited

U.S. PATENT DOCUMENTS

| | | | | |
|---|---|---|---|---|
| 327,296 A * | 9/1885 | McGinnis | .................... | 411/454 |
| 1,876,021 A * | 9/1932 | Quigley | ........................ | 29/271 |
| 1,891,895 A * | 12/1932 | Nagel | ........................ | 411/453 |
| 2,223,871 A * | 12/1940 | Johnson | ........................ | 411/453 |
| 2,515,773 A * | 7/1950 | Johnson | ........................ | 411/453 |
| 3,277,769 A * | 10/1966 | Lippmeier | ................... | 411/394 |
| 3,505,919 A * | 4/1970 | Thurner et al. | ............... | 411/440 |
| 3,555,957 A * | 1/1971 | Hermle | ........................ | 411/440 |
| 3,818,749 A * | 6/1974 | Yankee et al. | .................. | 72/469 |
| 4,241,638 A * | 12/1980 | Shimizu et al. | ............. | 411/386 |
| 4,323,326 A * | 4/1982 | Okada et al. | ................. | 411/412 |
| 4,329,099 A * | 5/1982 | Shimizu et al. | ............. | 411/412 |
| 4,718,802 A * | 1/1988 | Rockenfeller et al. | ....... | 411/421 |
| 4,874,278 A * | 10/1989 | Kawashita | ................... | 411/386 |
| 5,127,785 A * | 7/1992 | Faucher | ....................... | 411/453 |
| 5,261,770 A * | 11/1993 | Hoepker et al. | ............. | 411/441 |
| 5,375,957 A * | 12/1994 | Golledge | ..................... | 411/453 |
| 6,000,892 A * | 12/1999 | Takasaki | ..................... | 411/413 |
| 6,328,516 B1 * | 12/2001 | Hettich | .................... | 411/387.2 |
| 6,805,525 B2 * | 10/2004 | Oswald | ....................... | 411/499 |
| 6,851,906 B2 * | 2/2005 | Gassmann et al. | .......... | 411/440 |
| 7,040,851 B2 | 5/2006 | Esser et al. | | |
| 2002/0187018 A1 * | 12/2002 | Gassmann et al. | .......... | 411/439 |

* cited by examiner

*Primary Examiner*—Flemming Saether
(74) *Attorney, Agent, or Firm*—Abelman, Frayne & Schwab

(57) ABSTRACT

A fastening element has a head (14), a stem (11) adjoining the head 914) and having a tip at its end remote from the head (14), a first bullet-shaped section (21) extending from the tip (13) in a direction of the head (14), and a thread profile (15) provided on the stem (11) and having, on the second section (22), a constant steep gradient with a lead angle ($\beta_2$) from 50° to 74° and, on the first section (21), a gradient that increases from the lead angle ($\beta_2$) of the second section (22) toward the tip (13), with a lead angle ($\beta_1$) at a half of a length between the tip (13) and the end (24) of the first section (21) remote from the tip (13) amounting to at least 75°.

6 Claims, 1 Drawing Sheet

FASTENING ELEMENT

BACKGROUND OF THE INVENTION

1. Field of the Invention

The present invention relates to a fastening element having a stem with a tip at one of its ends and head arranged at an end of the stem opposite the tip, with the stem having a first spherical section extending from the tip in the direction of the head, and a second section adjoining the first section at an end of the first section remote from the tip and extending in the direction of the head, and a thread profile provided on the stem.

2. Description of the Prior Art

Fastening elements of the type described above, such as nails, bolts and the like are usually formed of steel and are used, in fastening technology for securing objects to hard materials such as concrete, metal, and stone. The drive-in process of such fastening elements is carried out with high speed, and the fastening elements are driven-in percussively or otherwise, e.g., with combustion-driven tools.

German Publication DE 101 19 800 A1 discloses a fastening element having a head and a stem adjoining the head and provided, at its end remote from the head, with a tip. The stem has a first spherical section that tapers toward the tip, and a second section that adjoins the first section and extends in the direction toward the head. The spherical first section and the following second section are provided, at least partially, with a knurl profile. This profile increases friction and, therefore, abrasion of the material.

U.S. Pat. No. 5,127,785, from which the present invention proceeds, discloses a nail for suspending of supports and that has a stem having a first bullet-shaped or spherical section decreasing toward the tip, and a second cylindrical section. The head, which is provided at the end of the stem remote from the tip, has the same diameter as the second cylindrical section. The stem is provided with a deeply cut-in thread profile that ends in front of the tip and that only partially surrounds the rear stem region. The thread serves for removal of the material produced by the drivable-in nail and increases the friction between the nail and the constructional component.

The drawbacks of such fastening element consists in that with thread grooves having the same depth and with an intermediate gradient, at a very rapid drive-in displacement, which is carried out, e.g., with a combustion-driven setting tool, the thread does not lead to rotation of the nail but rather acts as a grater, causing substantial abrasion. The abrasion reduces the holding forces of a nail in the constructional component.

Accordingly, an object of the present invention is to provide a fastening element in which the foregoing drawbacks are eliminated.

Another object of the present invention is to provide a fastening element with good holding characteristics in a hard material, e.g., concrete or steel.

SUMMARY OF THE INVENTION

These and other objects of the present invention, which will become apparent hereinafter, are achieved by providing a fastening element the thread profile of which has, on a second section, a constant steep gradient with a lead angle from 50° to 74° and, on the first section, a gradient that increases from the lead angle of the second section toward the tip, with a lead angle at a half of a length between the tip and the end of the first section remote from the tip amounting to at least 75°.

With the inventive profile geometry, it is insured that the fastening element according to the present invention is drilled in in a constructional component even at high drive-in speeds of more than 50 m/sec, which are attained when the fastening element is driven-in with a combustion-driven setting tool. The rotation of the driven-in fastening element prevents high abrasion of a material of the constructional component. Rather, a thread profile is formed in the constructional component that increases the holding effect of the fastening element in the constructional component because of an improved form locking connection of the fastening element with the constructional component. In metallic constructional components, e.g., an inventive fastening element, which has a stem diameter of 4 mm, permits to obtain a holding value of 15 KN, with a middle drive-in depth of 12 mm.

Advantageously, the thread profile has at least three and, preferably, at least ten profile grooves. The grooves increase rotation of the fastening element. Very good results are obtained with fastening elements having a thread profile with a number of grooves from ten to fifteen.

Advantageously, the profile grooves are uniformly distributed over the circumference of the profiled region of the stem.

It is advantageous when the profile depth of the profile grooves in the second section is essentially constant (within manufacturing tolerances) and has a value that lies within a range from 0.04 mm to 0.15 mm. E.g., the profile grooves can have a constant depth of 0.06 mm in the second section. In the first section that adjoins the second section, the depth of the profile grooves decreases toward the tip and lies in a region between 0.01 mm and 0.15 mm E.g., with a constant depth of 0.06 mm of the profile grooves in the second section, the profile depth of the profile grooves in the first section decreases from the depth of 0.06 mm to a minimum of 0.01 mm toward the tip. With these profile depths, a good compromise is achieved that, on one hand, insures a good rotation of the fastening element and, on the other hand, causes only a minimal reduction of the drive-in energy.

It is advantageous when the profile width of the profile grooves in the second section is essentially constant (within manufacturing tolerances) and has a value that lies within a range from 0.1 mm to 0.8 mm. E.g., the profile grooves can have a constant width of 0.5 mm in the second section. In the first section that adjoins the second section, the width of the profile grooves decreases toward the tip and lies in a region between 0.8 mm and 0.05 mm. E.g., with a constant width of 0.5 mm of the profile grooves in the second section, the profile depth of the profile grooves in the first section decreases from the depth of 0.5 mm to a minimum of 0.2 mm toward the tip. These profile widths improve the effect of the rotation of the fastening element at high drive-in speeds.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENTS

Figure 1:
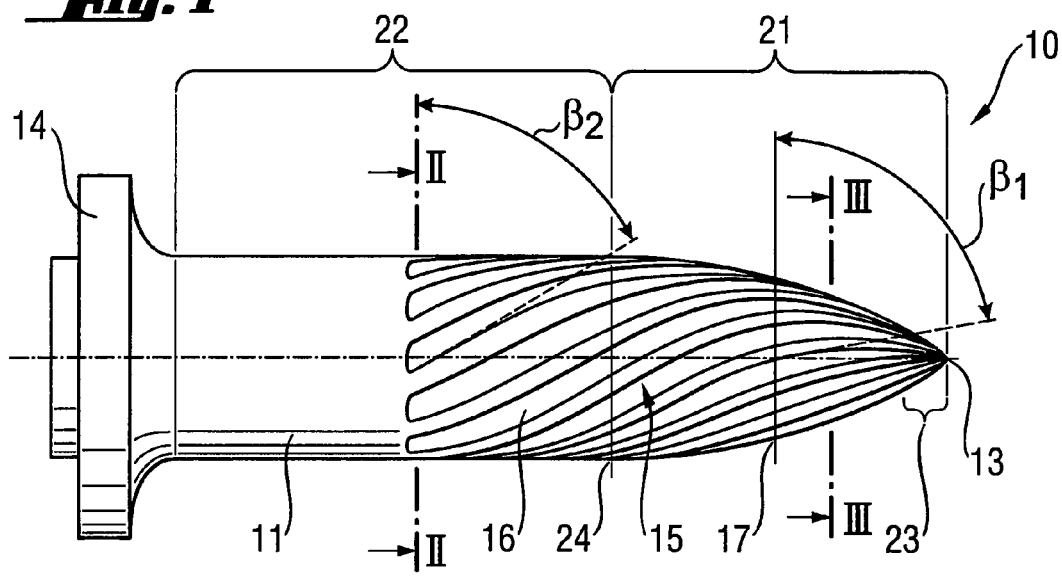
FIG. 1 a side view of a fastening element according to the present invention.
Figure 2:
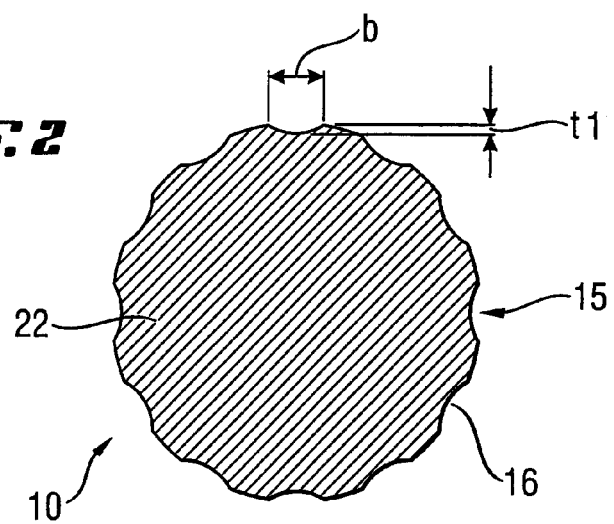
FIG. 2 a cross-sectional view along line II-II in FIG. 1.
Figure 3:
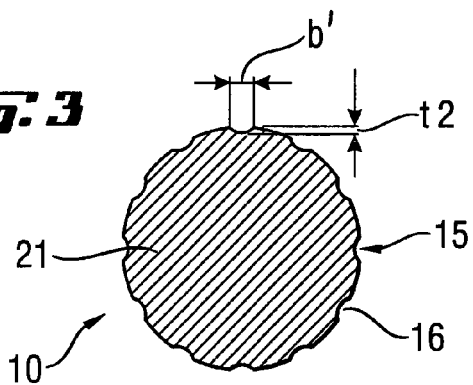
FIG. 3 a cross-sectional view along line II-II in FIG. 1

A fastening element 10 according to the present invention, which is shown in FIGS. 1-3, is formed as a nail having a head 14, a stem 11 adjoining the head 14, and a tip 13 provided at the end of the stem 11 opposite the head 14. The stem has two sections, a first bullet-shaped section 21 that directly adjoins the tip 13, and a second, substantially cylindrical section 22 that extends from the end 24 of the first section 21, opposite the tip 13, to the head 14. The region of the second section 22, which is adjacent to the first section 21, is provided with a thread profile 15 that also extends over the first section 21. In the embodiment shown in the drawings, the thread profile 15 has twelve profile groove 16. In the region of the second section 22, the thread profile 15 has a constant steep gradient with a lead angle $\beta_2$ of 60°. The angle is defined from an equation $\tan \beta = Ph/\pi d$, where Ph is the thread profile gradient and d is the diameter of the fastening element 10. In the region of the first section 21, the gradient and the lead angle $\beta$ increases toward the tip 13. Thus, e.g., at a half length 17 between the tip 13 and the opposite end 24, the lead angle $\beta_1$ is greater than 75°. In the embodiment shown in the drawings, the thread profile 15 extends up to the tip 13 and, in the front most region 23 of the first section 21 adjacent to the tip 13, extends almost coaxially to the longitudinal extent of the fastening element 10. It should be pointed out that the front most region 23 of the first section 21 can also be formed without a thread profile.

The profile grooves 16 have, in the region of the second section 22, a constant profile or groove depth t1 of 0.06 mm and a constant groove width b of 0.5 mm, with the diameter of the second section 22 being equal 4 mm. In the first section 21, the profile or groove depth t2 decreases from 0.06 mm in the region of the end 24 adjacent to the second section 22 to 0.01 mm in the region of the tip 13. The groove width $b^1$ likewise decreases from about 0.5 mm at the end 24 to 0.2 mm in the region of the tip 13.

Though the present invention was shown and described with reference to the preferred embodiment, such is merely illustrative of the present invention and is not to be construed as a limitation thereof, and various modifications of the present invention will be apparent to those skilled in the art. It is, therefore, not intended that the present invention be limited to disclose the embodiment or details thereof, and the present invention includes all variations and/or alternative embodiments within the spirit and scope of the present invention as defined by the appended claims.

What is claimed is:

1. A linearly driven-in fastening element, comprising a stem (11 having a tip (13) at one end thereof; a head (14) arranged at an end of the stem (11) opposite the tip (13), the stem (11) having a first bullet-shaped section (21) extending from the tip (13) in a direction of the head (14), and a second section (22) adjoining the first section (21) at an end of the first section (24) remote from the tip (13) and extending in the direction of the head (14); and a thread profile (15) provided on the stem (11), the thread profile (15) having, on the second section (22), a constant steep gradient with a lead angle ($\beta_2$) from 50° to 74° and, on the first section (21), a gradient that increases from the lead angle ($\beta_2$) of the second section (22) toward the tip (13), with a lead angle ($\beta_1$) at a half of a length between the tip (13) and the end (24) of the first section (21) remote from the tip (13) amounting to at least 75°.

2. A fastening element according to claim 1, wherein the thread profile (15) has at least three profile grooves (16).

3. A fastening element according to claim 1, wherein the thread profile (15) has at least ten profile grooves (16).

4. A fastening element according to claim 2, wherein the profile grooves (16) are uniformly distributed over a circumference of the stem (11).

5. A fastening element according to claim 1, wherein the thread profile (15) has a plurality of profile grooves (16) a depth of which is substantially constant in the second section (22) and is selected from a range from 0.04 mm to 0.15 mm.

6. A fastening element according to claim 1, wherein the thread profile (15) has a plurality of profile grooves (16) a width of which is substantially constant in the second section (22) and is selected in a range from 0.01 mm to 0.8 mm.

* * * * *